United States Patent [19]

Teague et al.

[11] Patent Number: 4,915,714
[45] Date of Patent: Apr. 10, 1990

[54] FIBER BED ELEMENT AND PROCESS FOR REMOVING SMALL PARTICLES OF LIQUIDS AND SOLIDS FROM A GAS STREAM

[76] Inventors: Richard K. Teague, 512 Factory Row, Winston-Salem, N.C. 27101; Dean M. Pruette, 5416 Edenfield Dr.; Jeffrey L. Parks, 1020 Winesap Dr., both of Kernersville, N.C. 27284

[21] Appl. No.: 210,548

[22] Filed: Jun. 23, 1988

[51] Int. Cl.⁴ ............................................. B01D 46/02
[52] U.S. Cl. ........................................ 55/486; 55/498; 55/501; 55/527; 55/DIG. 5; 55/DIG. 25; 210/DIG. 5; 428/300
[58] Field of Search ................. 55/486, 498, 501, 512, 55/527, 528, DIG. 5, DIG. 25; 210/DIG. 5; 428/300

[56] References Cited

U.S. PATENT DOCUMENTS

| | | | |
|---|---|---|---|
| 2,883,345 | 4/1959 | Taylor et al. | 210/DIG. 5 |
| 3,003,581 | 10/1961 | Greason | 55/527 X |
| 3,231,092 | 1/1966 | Goldman | 55/498 X |
| 3,344,929 | 10/1967 | Stripp | 55/527 X |
| 3,352,778 | 11/1967 | Brink, Jr. et al. | 55/185 X |
| 3,802,160 | 4/1974 | Foltz | 55/527 X |
| 3,918,936 | 11/1975 | Holloway et al. | 55/DIG. 25 |
| 4,053,290 | 10/1977 | Chen et al. | 55/DIG. 25 |
| 4,070,519 | 1/1978 | Lefkowitz et al. | 55/528 X |
| 4,086,070 | 4/1978 | Argo et al. | 55/97 |
| 4,093,437 | 6/1978 | Ichihara et al. | 55/528 X |
| 4,155,726 | 5/1979 | Steinmeyer | 55/DIG. 25 |
| 4,211,661 | 7/1980 | Perry | 55/486 X |
| 4,249,918 | 2/1981 | Argo et al. | 55/97 |
| 4,257,791 | 3/1981 | Wald | 55/498 X |
| 4,267,626 | 5/1981 | Terry | 55/DIG. 5 |
| 4,324,574 | 4/1982 | Fagan | 428/300 X |
| 4,424,248 | 1/1984 | Tesch et al. | 428/300 X |
| 4,443,233 | 4/1984 | Moran | 55/97 |
| 4,469,734 | 9/1984 | Minto et al. | 428/300 X |
| 4,522,876 | 6/1985 | Hiers | 428/300 X |
| 4,531,957 | 7/1985 | Malik | 428/300 X |
| 4,564,377 | 1/1986 | Kocatas | 55/DIG. 25 |
| 4,744,806 | 5/1988 | Ozolins et al. | 55/97 |
| 4,759,782 | 7/1988 | Miller et al. | 55/DIG. 25 |
| 4,818,257 | 4/1989 | Kennedy et al. | 55/97 |

FOREIGN PATENT DOCUMENTS

| | | | |
|---|---|---|---|
| 0172799 | 2/1986 | European Pat. Off. | 55/512 |
| 1548871 | 7/1979 | United Kingdom | 55/527 |

Primary Examiner—Robert Spitzer

[57] ABSTRACT

A fiber bed element and process for utilizing such element for removing and collecting small particles of liquids or soluble solids from a gas stream, the element formed of one or more layers of pin-punched fiber supported by an appropriate supporting structure, the fiber layers being subjected to pressure to achieve a selected density and the punched holes functioning to create drainage paths through which liquids may drain. The fiber layer density and fiber size is maintained uniform throughout the element so that the pressure drop of the saturated filter bed element will be between 1.1 and 3.0 times the pressure drop of the dry filter bed as originally constructed and before use.

26 Claims, 3 Drawing Sheets

FIBER BED ELEMENT AND PROCESS FOR REMOVING SMALL PARTICLES OF LIQUIDS AND SOLIDS FROM A GAS STREAM

BACKGROUND OF THE INVENTION

This invention relates to fiber bed elements and processes for removing and collecting small particles of liquids or soluble solids from a gas stream.

It is known to utilize fibers to make fiber bed elements for removing mists containing small particles of liquids or soluble solids from gas streams. The fibers are packed either randomly or in alignment and the gas to be treated is passed through the fiber bed with the small particles of liquids or soluble solids being captured by the fibers in the bed and the gas to be treated has passed through the fiber bed with the droplets being captured by the fibers in the bed. The captured droplets can coalesce on the fibers and form larger drops. The moving gas urges the coalesced drops toward the downstream face of the fiber bed where the liquid drains downwardly under the influence of gravity. Generally, reasonably high collection efficiencies can be achieved with a fiber bed element of this type.

Some of the more frequent applications include removal of acid mists, such as sulfuric acid mist, in acid manufacturing processes; plasticizer mists in, for example, polyvinyl chloride floor or wall covering manufacture; and water soluble solid aerosol such as, for example, emissions from ammonium nitrate prill towers. In removal of water soluble solid aerosols, the collected particulates are dissolved in a liquid within the fiber bed through use of an irrigated fiber bed or of a fogging spray of liquid such as water injected into the gas stream prior to its reaching the fiber bed.

A fiber bed element is designed to collect fine mist particles and then drain them through the structure of the bed. In the design of a mist fiber bed element, the total flow to be processed is specified and the fiber bed element is then designed to provide the required collection efficiency for the mist and to have a pressure drop within the range of acceptable economic performance. The fiber size and thickness of the fiber bed are also chosen in the design procedure. The size of an individual filter or the number of filters is also chosen in the design criteria to meet the overall economic optimum system.

These design practices are well known in the art and are described in detail in various text and patent references. See, for example, the discussion set forth in U.S. Pat. No. 4,086,070.

When the fiber bed element is originally constructed in the factory, it has a dry condition and its characteristics can be measured in the dry condition before it becomes saturated with collected mists. The performance or operation of the element, when it is in the new dry state, is referred to as the dry bed performance or, more particularly, the dry bed pressure drop and collection efficiency at design or operating conditions.

When the element is put into operation, liquid collects in the bed element and is held therein to a certain extent. This liquid hold up results in an additional pressure resistance to gas flow.

In currently used elements, the liquid hold up builds up to a significant level. At steady state operating conditions, mist is draining at the same rate as mist is collecting, and the pressure drop of the saturated or wet fiber bed element will be between 1.6 and 4 times the pressure drop or pressure resistance of the dry bed element as originally constructed. The range of increase, 1.6 to 4.0, can be related to the amount of liquid in the gas stream being processed. The amount of liquid is measured in milligrams of mist material per cubic meter of gas processed. The fiber size and fiber bed voidage also affect the amount of pressure resistance increase.

The increase in pressure resistance is not the result of the insoluble or dirt particles that can build up and add additional pressure resistance. The element, at operating conditions, will operate in this steady state mode with the collected mist or soluble solid mist collecting and simultaneously draining through the fiber bed. At steady conditions, the pressure resistance will be constant over a long period of time.

Another feature generally accepted in currently used fiber bed elements is that liquid flows to the exterior face of the element and flows down on that exterior face until it reaches the bottom of the chamber containing the element. Because the collected liquid drains to the downstream face, reentrainment of this collected liquid can occur. This carryover reentrainment in the cleaned gas results in a lower overall mist control performance.

In filters currently in use such as those described in U.S. Pat. Nos. 4,086,070 and 4,249,918, which disclose roving wound or hand packed fibers, the collected liquid is described as draining through to the downstream face of the collecting fiber and flowing as discreet streams or droplets from the downstream face. Tests performed on filter bed elements such as shown in these patents reflect a pressure drop, when wet with collecting liquid, of approximately 1.6 to 4.0 times the pressure drop existing when the mist filter is dry. This range 1.6 to 4.0 is for liquid mist rates of 0.17 grams of liquid per cubic meter of gas treated up to 10.5 grams of liquid per cubic meter of gas treated. Test data on this type of filter is set forth in the following Table I.

TABLE I

| TESTS ON STANDARD WOUND MIST FILTER | | | | |
|---|---|---|---|---|
| FILTER SIZE | | | | |
| CAGE | | | | |
| HEIGHT (meters): | | | 2.440 | |
| DIAMETER (meters): | | | 0.610 | |
| FIBER BED | | | | |
| BED THICKNESS (meters): | | | 0.057 | |
| BED DENSITY (Kg/M$^3$): | | | 173.340 | |
| FIBER SIZE (micron): | | | 8.000 | |
| BED VELOCITY (M/sec) | MIST RATE (g/M$^3$) | PRESSURE DROP DRY BED | (KPa) WET BED | RATIO (W/D) |
| 0.197 | 2.507 | 1.569 | 2.764 | 1.762 |
| 0.074 | 2.684 | 0.590 | 1.046 | 1.772 |
| 0.144 | 2.966 | 1.145 | 2.067 | 1.804 |
| 0.197 | 4.061 | 1.569 | 2.789 | 1.778 |
| 0.227 | 6.462 | 1.531 | 2.876 | 1.878 |

There are various techniques used with the elements described in U.S. Pat. No. 4,086,070 to prevent reentrainment of the collected liquid from the exit face of the bed. Sometimes a second layer of fiber is added so that the liquid drains down within the second layer or within large diameter fibers having greater spacing between the fibers.

There are a number of two stage filter beds described in the patent and general technical literature where a second drainage layer is added to the collecting layer to prevent reentrainment of the collected liquid mist. Note the use of a second layer in U.S. Pat. No. 4,086,070.

In another type of mist filter element, two fiber beds are needle punched together. Russian Patent No. 291457 describes the use of a needle punched mist filter bed using two sizes of fiber in the bed, the larger fiber placed on the downstream face thus permitting the collecting liquid to drain from the downstream or exit face of the bed. The needle punching technique is designed to promote liquid flow to the downstream side or downstream face. The actual method of fabricating the element is not described, but the feature of having liquid draining to the downstream face is described. This patent emphasizes the use of a second layer of fiber to prevent reentrainment of the collected liquid.

OBJECTIVES OF THE INVENTION

A primary objective of the present invention is to provide a fiber bed element that will significantly reduce the operating pressure loss presently experienced with current beds.

Another objective of the present invention is to provide a fiber bed element that does not need a plurality of differing fiber layers, since the liquid drains within the space of the collecting bed and no liquid streams are present on the exterior surface.

These and other objectives of the present invention will become more apparent after a consideration of the following detailed specification taken in conjunction with the accompanying drawings wherein like characters of reference designate like parts throughout the several views.

SUMMARY OF THE INVENTION

A fiber bed element and method for making same used in removing and collecting small particles of liquids or soluble solids from a gas stream which is formed of a plurality of perforated layers of fiber carried by a supporting device wherein the act of perforating and the perforations created thereby create drainage paths through which the liquids may drain, and the multiple fiber layers have a uniform density within a range of from about 80 kilograms of fiber per cubic meter of bed to about 480 kilograms of fiber per cubic meter of bed.

DETAILED DESCRIPTION OF THE INVENTION

Figure 1:
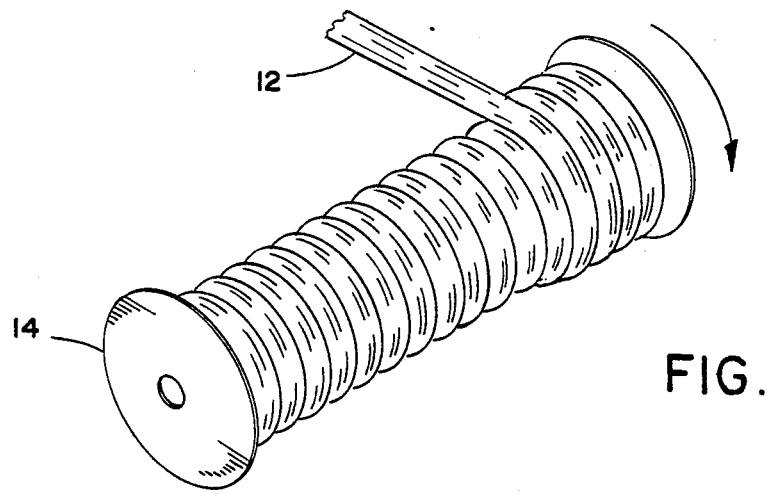
FIG. 1 is a perspective view of a common method of filter bed element construction whereby a sliver roving is wound around a cage to form a bed of fibers.
Figure 5:
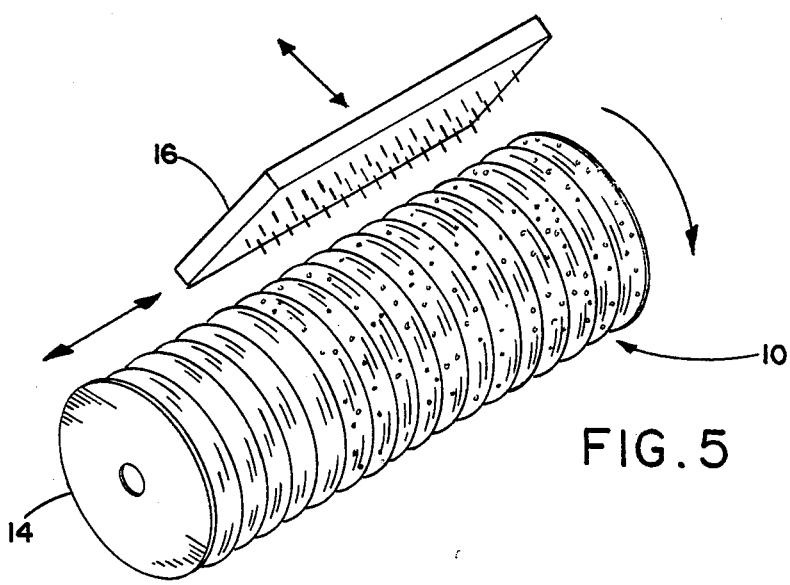
FIG. 5 is a perspective view of one embodiment of the present invention showing a winding of multi-layered fiber which has been punched with a pin type punching device that penetrates into the surface of the fiber bed and changes the relationship of some of the fibers present.

The fiber bed element shown generally as 10 in FIG. 5 which makes up the present invention is formed by applying a plurality of fiber layers 12 in the form of a roving each having uniform fiber size surrounding, as shown in FIG. 1, a cylinder 14 preferably constructed in the form of a support screen. After a layer 12 has been applied to the support screen, the fiber is punched with a pin type punching device 16 which penetrates the fiber bed and changes the relationship of some of the fibers present. While the fiber layers may be punched prior to or after being applied to the screen, the punching operation is preferably done after each layer is applied to the support screen. It has been found advantageous to use fiber layers ranging from approximately $\frac{1}{8}''$ to $\frac{1}{2}''$ in thickness.

As each layer is applied, the punching procedure is repeated. The punches penetrate the fiber bed in a range of between 25% and 100% of the layer of fibers applied. It has been found that the greater the depth of penetration in the punching procedure, the more pronounced the effect on the reduction of the wet fiber bed pressure resistance.

Figure 7:
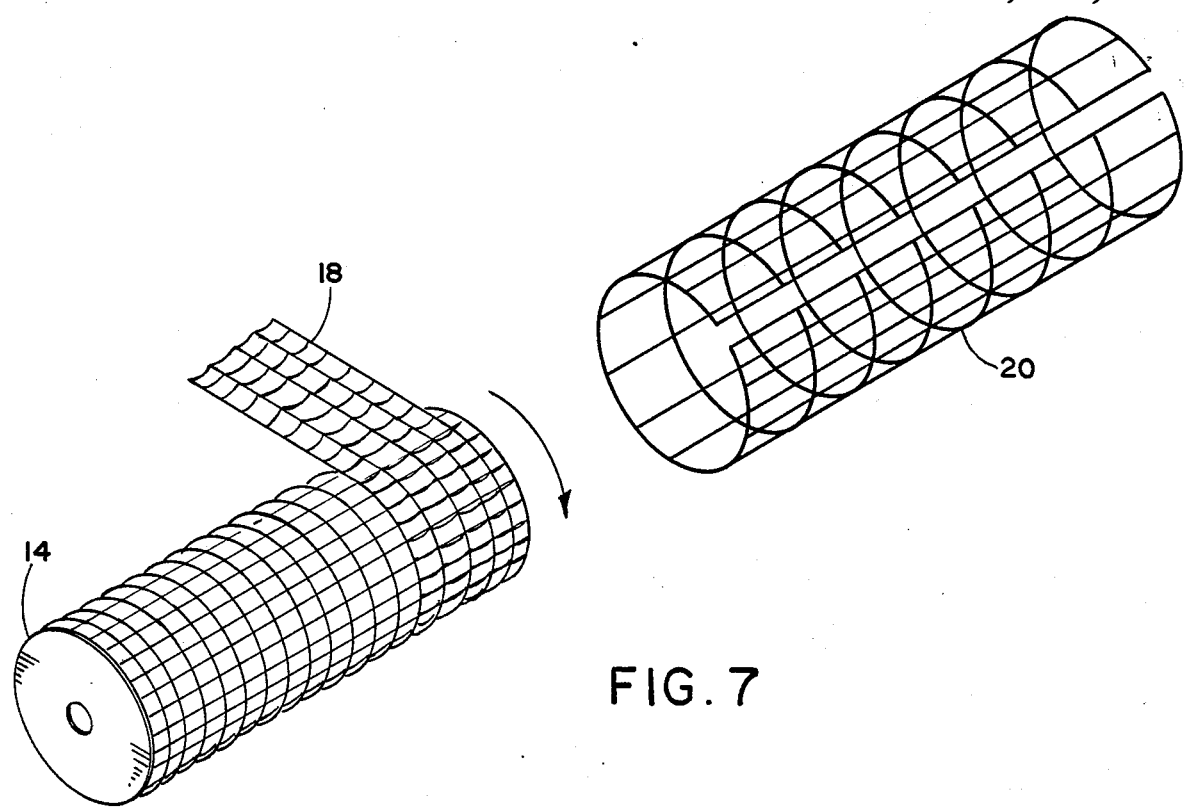
Figure 3:
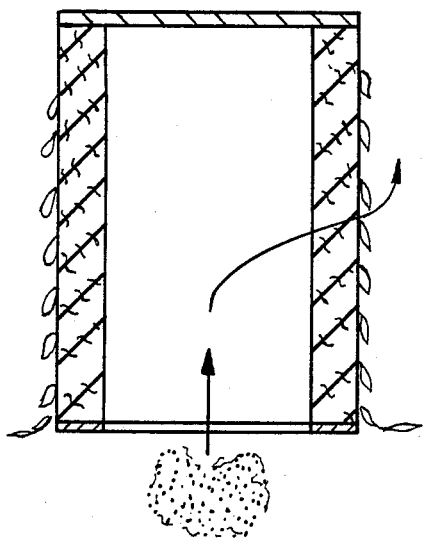
FIG. 3 is a perspective view of a conventional type filter where the collected mist passes through the bed to the outside surface and drains down the outside of the element.
Figure 4:
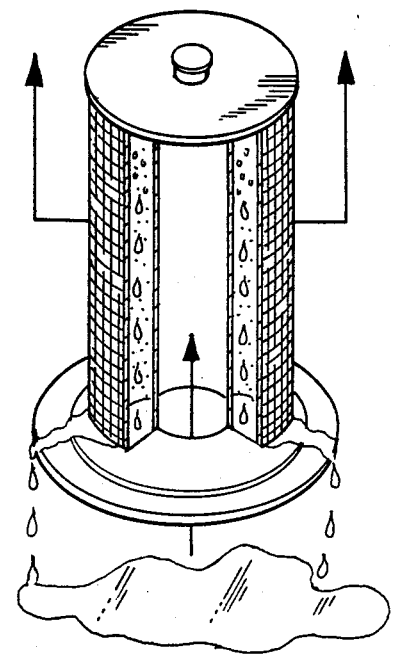
FIG. 4 is a perspective view of a general configuration of the filter bed elements of the present invention which are disposed vertically and permit gas to pass through horizontally with the collected mist being collected in the bed and draining down through the bed and exiting at the bottom of the fiber bed filter.

The density of the mist filter can be adjusted by the tension with which the roving is applied or by the compression of the roving as it is being applied to the cylinder. The density can also be controlled by varying the pressure against the fiber bed with a net 18 such as shown in FIG. 7. The choice of the method of density variation depends on the fiber type, fiber diameter and the required density given in the design calculations.

As the roving is applied to the cylinder, either during its positioning thereon or after it is in place, holes are punched in with a pin type device to form small drainage paths in the fiber bed through which the liquid can drain.

Different sizes of fibers can be used such as those commonly available in textile materials. Glass fibers are also acceptable and usually have diameters within the range of between 3 and 35 microns with typical sizes being between 6 and 25 microns. Polypropylene fibers are available in sizes from 20 microns to 300 microns. Any material commonly available as a filter fiber can be used in the present invention.

The final density of the multi-layered fiber bed is preferably within the range of between 80 to 480 kilograms of fiber per cubic meter of bed. Typically, for glass fiber, the density would be in the range of between 80 to 240 kilograms of glass fiber per cubic meter.

Figure 6:
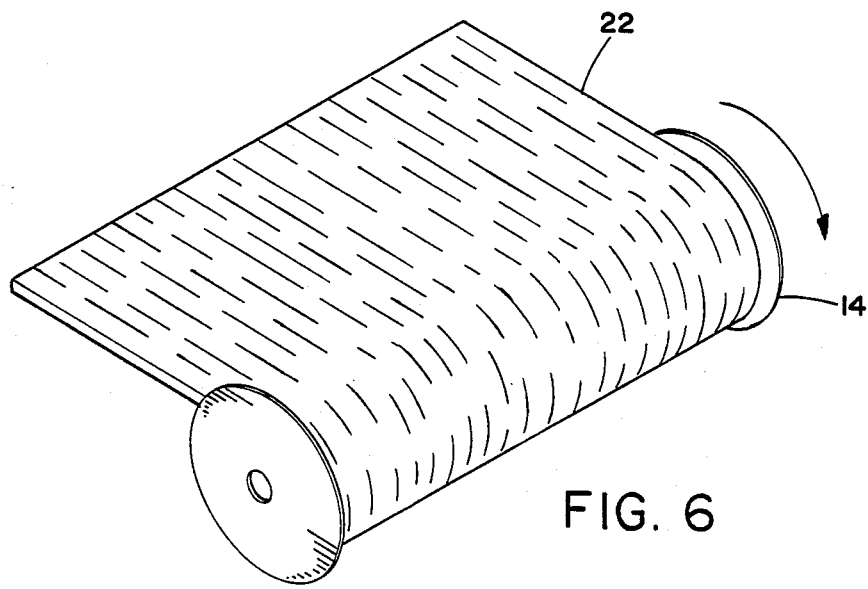
FIGS. 6 and 7 are perspective views of an alternative embodiment of the fiber bed element comprising the present invention whereby layers of previously punched fiber material are wound about a cylinder and compressed thereafter to achieve a density sufficient to provide high efficiency collection of sub micron mists.
Figure 2:
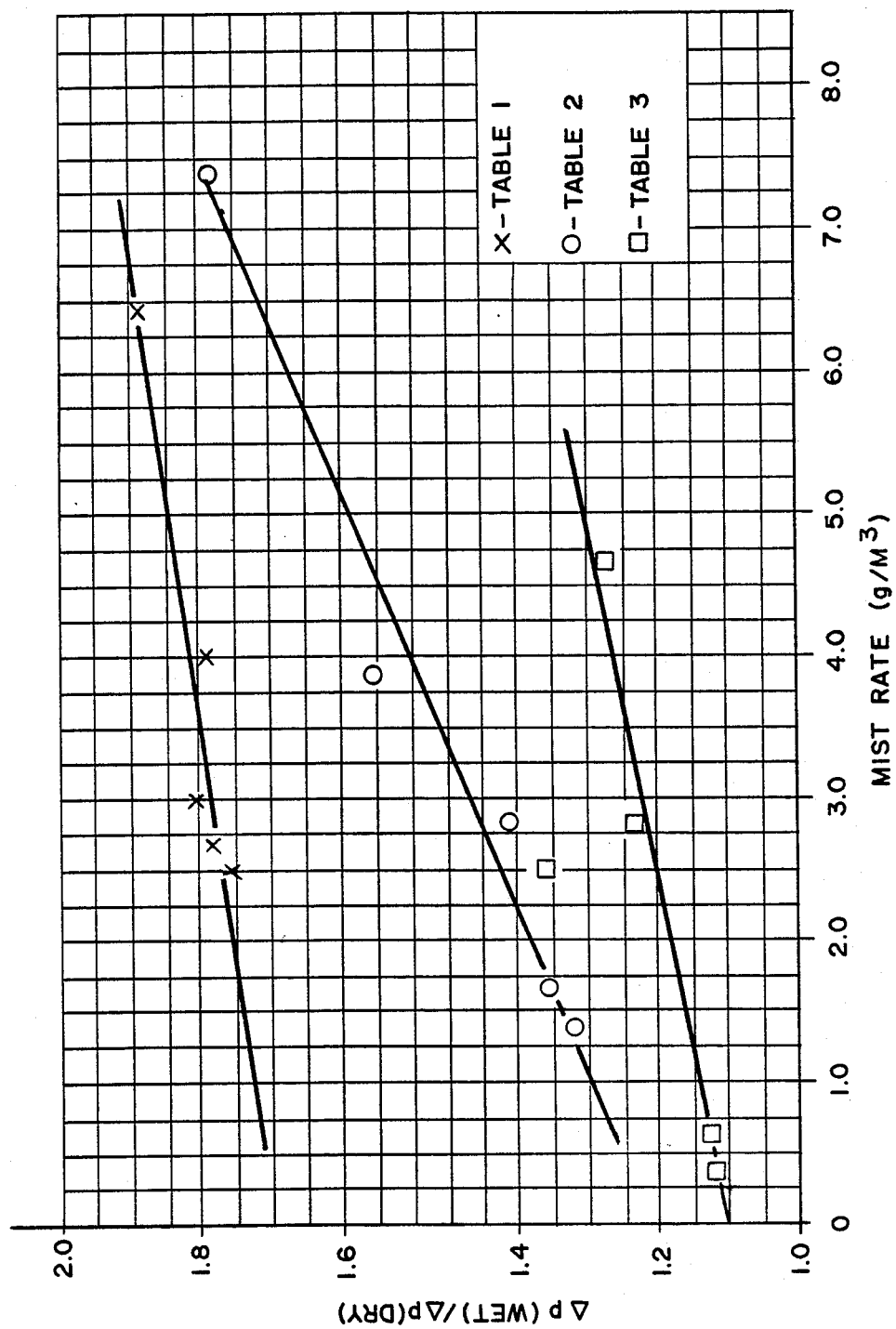
FIG. 2 is a graphic depiction of the test data set forth in Table I.

In another variation of the fiber bed element comprising the present invention, a blanket of glass fibers 22 that has been needle punched is applied to a cylinder made of screen wire. The blanket of glass fiber 22 is then compressed with a net 18 while it is being applied to the cylinder to achieve a density sufficient to provide high efficiency collection of sub micron mist. After the blanket has been applied and compressed to the appropriate density, an outside mesh cage 20 is put in place. The outside mesh cage 20 is not necessarily required. Need is determined primarily by whether or not the outside of the bed needs to be protected from physical damage during handling, installation and service. The construction of any element by this method is illustrated in FIGS. 6 and 7.

Blankets of glass material typically have fibers with diameters falling within the range of between 5 to 25 microns. Glass fibers are also available with diameters of up to 35 microns in size. Fibers of this size can be added to the blanket.

The density of the bed before compression typically is around 144 kilograms per cubic meter. After the bed is compressed and held by net 18 to achieve its final configuration, it has a density of approximately 176 kilograms per cubic meter. The element formed provides a density sufficient to collect mist at the desired performance level.

The fiber size and density throughout the bed is uniform. There are not two beds involved, one which has fine fibers and a second which has coarse fibers, as is commonly utilized in the prior art. The density and fiber size are uniform throughout the entire thickness of the bed. The blanket is compressed during construction so that there are no voidages in the bed between layers of blanket. This is important to achieve optimum collection and no short circuiting of the gas being treated.

It was found that when a fiber bed element embodying the present invention was constructed and tested, the pressure drop increase, due to the collected liquid, was much less than with elements that had been prepared without the punching procedure. For elements embodying the present invention, the pressure drop increase, due to collected liquid, ranged from as low as 1.1 times the dry bed pressure drop to 3.0 times the dry bed pressure drop. It was also found that for both conventional elements and the element embodying the present invention, the increase in pressure drop due to liquid collected in the bed is dependent upon the rate of liquid addition to the bed. In all cases, at the same liquid addition rate, measured as mist loading of milligrams of mist per cubic meter of gas processed, the new bed had a lower increase in pressure drop due to the collected mist than the conventional bed.

Fiber bed elements made in accordance with the present invention can range from ½ inch to 4 inches in thickness; however, such elements are typically within the range of from 2 inches to 3 inches in thickness.

Table II below sets forth data obtained from testing a filter bed element constructed in accordance with the present invention and illustrated in FIG. 5.

TABLE II

| TEST ON: ROVING WOUND AND PUNCHED | | | | |
|---|---|---|---|---|
| FILTER SIZE CAGE | | | | |
| HEIGHT (meters): | | | 2.440 | |
| DIAMETER (meters): | | | 0.610 | |
| FIBER BED | | | | |
| BED THICKNESS (meters): | | | 0.057 | |
| BED DENSITY (Kg/M³): | | | 160.500 | |
| FIBER SIZE (microns): | | | 8.000 | |
| BED VELOCITY (M/sec) | MIST RATE (g/M³) | PRESSURE DROP DRY BED | (KPa) WET BED | RATIO (W/D) |
| 0.209 | 1.483 | 8.045 | 10.700 | 1.330 |
| 0.145 | 1.660 | 5.579 | 7.587 | 1.360 |
| 0.205 | 2.860 | 7.908 | 11.151 | 1.410 |
| 0.078 | 3.884 | 3.015 | 4.703 | 1.560 |
| 0.074 | 7.380 | 2.858 | 5.087 | 1.780 |

Test data for an element having slightly different components is also set forth below as Table III in FIG. 7.

TABLE III

| TEST ON: FIBER BLANKET PUNCHED AND WOUND | | | | |
|---|---|---|---|---|
| FILTER SIZE CAGE | | | | |
| HEIGHT (meters): | | | 2.440 | |
| DIAMETER (meters): | | | 0.610 | |
| Fiber BED | | | | |
| BED THICKNESS (meters): | | | 0.051 | |
| BED DENSITY (Kg/M³): | | | 176.550 | |
| FIBER SIZE (microns): | | | 9.000 | |
| BED VELOCITY (M/sec) | MIST RATE (g/M³) | PRESSURE DROP DRY BED | (KPa) WET BED | RATIO (W/D) |
| 0.212 | 0.388 | 1.544 | 1.718 | 1.113 |
| 0.149 | 0.636 | 1.066 | 1.208 | 1.133 |
| 0.079 | 2.507 | 0.568 | 0.772 | 1.360 |
| 0.207 | 2.789 | 1.484 | 1.830 | 1.233 |
| 0.079 | 4.696 | 0.568 | 0.722 | 1.272 |

An additional feature was observed with the fiber bed element embodying the present invention as compared to conventional elements. In conventional elements, the collected liquid mist was forced through the bed to the exterior surface and would then drain down on the exterior face. With the element embodying the present invention, it was observed that the liquid drained down inside the fiber bed and exited at the bottom of the fiber bed. It was also observed that though the exit face of the fiber bed element embodying the present invention sometimes appeared moist, there were no discreet streams of liquid present or draining from the exit face of the collecting fibers. The characteristic of having the liquid drain within the bed is a significant difference and an improvement over current mist filters which have the collected liquid draining from the downstream face.

This additional feature is very important in reducing the possibility of reentraining any of the collected mist into the clean gas leaving the filter bed element. The reentrainment of liquid mist is well-known to those practicing the art of mist filter design and many devices have been developed for controlling this reentrainment. The present invention represents a significant step forward in this area.

The foregoing description of the several embodiments of this invention is not intended as limiting of the invention. As will be apparent to those skilled in the art, the inventive concept set forth herein can find many applications in the art of fiber bed separations and many variations on and modifications to the embodiments described above may be made without departure from the spirit and scope of this invention.

What is claimed is:

1. A fiber bed element for removing and collecting small particles of liquids or soluble solids from a gas stream comprising: a layer of pin-punched fiber from ⅛" to 1' thick; means supporting said fiber layer; a second or more layers of pin-punched fiber positioned against said first layer and maintained by said supporting means, the pin-punched holes and said layers functioning to create drainage paths through which the liquids may drain, the multiple layered element having a density of from about 80 kilograms of fiber per cubic meter of bed to about 480 kilograms of fiber per cubic meter of bed.

2. The element as claimed in claim 1 wherein said fiber is glass.

3. The element as claimed in claim 2 wherein said fiber is from about 3 microns to about 35 microns in diameter.

4. The element as claimed in claim 1 wherein said fiber is polypropylene.

5. The element as claimed in claim 4 wherein said fiber is from about 20 microns to about 300 microns in diameter.

6. The element as claimed in claim 1 wherein all layers are of the same fiber.

7. The element as claimed in claim 6 wherein the fiber density is from about 80 kilograms to about 480 killigrams per cubic meter.

8. The element as claimed in claim 7 wherein the fiber layers are formed of metal.

9. The element as claimed in claim 7 wherein the fiber layers are formed of ceramic.

10. The element as claimed in claim 6 wherein the pressure drop of the saturated filter bed will be between 1.1 and 3.0 times the pressure drop of the dry filter bed as originally constructed and before use.

11. The element as claimed in claim 1 wherein the layers are of different sized fiber.

12. A method for making a fiber bed element for removing and collecting small particles of liquids or soluble solids from a gas stream comprising the steps of: arranging a layer of fibers on a supporting screen; punching a plurality of pin holes in the fiber layer; placing additional fiber layers against the first layer and producing a plurality of pin holes as it is placed against the previous layer and supported by the screen; and positioning a retaining device against the top fiber layer to protect the bed surface from damage.

13. The method as claimed in claim 12 wherein the fiber layers are formed of glass.

14. The method as claimed in claim 13 wherein the fiber is from about 20 microns to about 300 microns in diameter.

15. The method as claimed in claim 12 wherein the fiber layers are formed of polypropylene.

16. The method as claimed in claim 15 wherein the fiber layers are formed of metal.

17. The method as claimed in claim 15 wherein the fiber layers are formed of ceramic.

18. The method as claimed in claim 15 wherein said fiber layers are compressed to achieve a density sufficient to provide high efficiency collection of submicron mist and the pressure drop of the saturated filter bed will be between 1.1 and 3.0 times the pressure drop of the dry filter bed as originally constructed.

19. The method as claimed in claim 12 wherein all layers are of the same fiber.

20. The method as claimed in claim 19 wherein the density and fiber size is uniform throughout the bed.

21. The method as claimed in claim 12 further comprising the step of compressing the fiber layers to achieve a density sufficient to provide high efficiency collection of submicron mist.

22. The method as claimed in claim 21 wherein the density of each fiber layer before compression is approximately 144 kilograms per cubic meter and the density after compression is approximately 176 kilograms per cubic meter.

23. The method as claimed in claim 12 wherein the fiber layers are positioned against each other to eliminate voidages therebetween.

24. A method for making a fiber bed element for removing and collecting small particles of liquids or soluble solids from a gas stream comprising the steps of: punching a plurality of pin holes on a continuous fiber layer; arranging a continuous fiber layer on a supporting screen; and tensioning the continuous fiber layer to achieve a predetermined fiber layer density.

25. The method as claimed in claim 24 wherein additional punched continuous fiber layers are arranged and tensioned on the supporting screen.

26. The method as claimed in claim 24 wherein the fiber is from about 3 microns to about 35 microns in diameter.

* * * * *